US00RE45913E

(19) United States
(12) Reissued Patent
Giddens

(10) Patent Number: US RE45,913 E
(45) Date of Reissued Patent: Mar. 8, 2016

(54) RECOIL COVER FOR AN INTERNAL COMBUSTION ENGINE

(71) Applicant: LIQUID COMBUSTION TECHNOLOGY, LLC, Travelers Rest, SC (US)

(72) Inventor: Keith B. Giddens, Travelers Rest, SC (US)

(73) Assignee: Liquid Combustion Technology, LLC, Travelers Rest, SC (US)

(21) Appl. No.: 29/443,164

(22) Filed: Jan. 14, 2013

Related U.S. Patent Documents

Reissue of:
(64) Patent No.: Des. 549,241
Issued: Aug. 21, 2007
Appl. No.: 29/211,157
Filed: Aug. 11, 2004

U.S. Applications:
(62) Division of application No. 29/316,068, filed on Aug. 20, 2009, now Pat. No. Re. 43,920, which is an application for the reissue of Pat. No. Des. 549,241.

(51) LOC (10) Cl. ..... 15-01
(52) U.S. Cl.
USPC ..... D15/5
(58) Field of Classification Search
USPC ..... D15/1–5; 123/41.7, 50 A, 50 R, 50 B, 123/198 E, 65 R, 51 R, 657; 74/6; 474/8
See application file for complete search history.

(56) References Cited

U.S. PATENT DOCUMENTS

D257,844 S 1/1981 Stevens
D282,071 S 1/1986 Nakamura (Continued)

OTHER PUBLICATIONS

U.S. Appl. No. 29/199,532 entitled *Portion of an Engine;* In re: Giddens; filed Feb. 16, 2004.

(Continued)

*Primary Examiner* — Sandra Snapp
(74) *Attorney, Agent, or Firm* — J. Bennett Mullinax, LLC

(57) CLAIM

The ornamental design for a [a portion of] recoil cover for an internal combustion engine, as shown and described.

DESCRIPTION

*Term notice: more than one reissue application has been filed for the reissue of U.S. Pat. No. Des. 549,241. The Reissue Application being filed herewith and Reissue application No. 29/316,068 are all divisional reissues of U.S. Pat. No. Des. 549,241.*

FIG. 1 is a perspective view of a [portion of a] recoil cover for an internal combustion engine according to [an] *a first* embodiment of the present design;

FIG. 2 is a front elevation view of [the portion of] a recoil cover for an internal combustion engine shown in FIG. 1;

FIG. 3 is a top plan view of [the portion of] a recoil cover for an internal combustion engine shown in FIG. 1;

FIG. 4 is a bottom plan view of [the portion of] a recoil cover for an internal combustion engine shown in FIG. 1;

FIG. 5 is a right side elevation view of [the portion of] a recoil cover for an internal combustion engine shown in FIG. 1; and, FIG. 6 is a left side elevation view of [the portion of] a recoil cover for an internal combustion engine shown in FIG. 1.

*FIG. 7 is a perspective view of a recoil cover for an internal combustion engine according to a second embodiment of the present design;*

*FIG. 8 is a front elevation view of a recoil cover for an internal combustion engine shown in FIG. 7;*

*FIG. 9 is a top plan view of a recoil cover for an internal combustion engine shown in FIG. 7;*

*FIG. 10 is a bottom plan view of a recoil cover for an internal combustion engine shown in FIG. 7;*

*FIG. 11 is a right side elevation view of a recoil cover for an internal combustion engine shown in FIG. 7; and,*

*FIG. 12 is a left side elevation view of a recoil cover for an internal combustion engine shown in FIG. 7.*

The broken lines shown in FIGS. [1-6] *1-12* are for illustrative purposes only and form no part of the claimed design.

1 Claim, 8 Drawing Sheets

Matter enclosed in heavy brackets [ ] appears in the original patent but forms no part of this reissue; matter printed in italics indicates the additions made by reissue.

NEW

(56) References Cited

U.S. PATENT DOCUMENTS

| | | | | | |
|---|---|---|---|---|---|
| D294,832 | S | | 3/1988 | Itou et al. | |
| 4,813,385 | A | | 3/1989 | Yamaguchi et al. | |
| D305,432 | S | | 1/1990 | Hashigaki | |
| D307,147 | S | | 4/1990 | Sasaki et al. | |
| D307,148 | S | | 4/1990 | Mikado | |
| D308,871 | S | | 6/1990 | Harkness et al. | |
| D308,872 | S | | 6/1990 | Harkness et al. | |
| D309,457 | S | | 7/1990 | Eifert et al. | |
| D309,458 | S | | 7/1990 | Johnson et al. | |
| 5,072,627 | A | | 12/1991 | Horiye et al. | |
| D330,897 | S | | 11/1992 | Carlson et al. | |
| D331,929 | S | | 12/1992 | Leaf et al. | |
| 5,197,426 | A | * | 3/1993 | Frangesch et al. | 123/198 E |
| D342,076 | S | | 12/1993 | Heismann | |
| D343,843 | S | | 2/1994 | Mikado | |
| D353,381 | S | | 12/1994 | Yoshida et al. | |
| D367,070 | S | | 2/1996 | Maeda et al. | |
| D392,647 | S | | 3/1998 | Ueda et al. | |
| D396,045 | S | | 7/1998 | Neeley | |
| D396,476 | S | | 7/1998 | Shimizu | |
| D397,342 | S | | 8/1998 | Shimizu | |
| D398,010 | S | | 9/1998 | Yoshida et al. | |
| D414,498 | S | | 9/1999 | Yoshida | |
| D417,675 | S | | 12/1999 | Yaguchi et al. | |
| D441,714 | S | | 5/2001 | Yuzuriha | |
| D443,280 | S | | 6/2001 | Shimizu | |
| 6,240,889 | B1 | | 6/2001 | Kuwabara et al. | |
| D444,478 | S | | 7/2001 | Shimizu | |
| D449,051 | S | | 10/2001 | Miyashita | |
| 6,331,740 | B1 | | 12/2001 | Morohoshi et al. | |
| 6,362,533 | B1 | | 3/2002 | Morohoshi et al. | |
| D457,891 | S | | 5/2002 | Matre | |
| D462,363 | S | * | 9/2002 | Burmeister et al. | D15/4 |
| 6,489,690 | B1 | | 12/2002 | Hatsugai et al. | |
| D468,751 | S | * | 1/2003 | Neeley et al. | D15/1 |
| 6,520,141 | B2 | | 2/2003 | Ryczek et al. | |
| 6,525,430 | B1 | | 2/2003 | Asai et al. | |
| D471,207 | S | * | 3/2003 | Kern et al. | D15/5 |
| D474,783 | S | | 5/2003 | Momoi | |
| D475,065 | S | | 5/2003 | Shimizu et al. | |
| D478,042 | S | | 8/2003 | Yaguchi et al. | |
| D481,042 | S | | 10/2003 | Yuzuriha et al. | |
| D481,043 | S | | 10/2003 | Yuzuriha et al. | |
| D488,167 | S | | 4/2004 | Momoi | |
| D491,193 | S | | 6/2004 | Davis | |
| D503,722 | S | * | 4/2005 | Stenz et al. | D15/1 |
| D503,723 | S | | 4/2005 | Giddens | |
| D515,589 | S | * | 2/2006 | Lin et al. | D15/1 |
| D521,024 | S | | 5/2006 | Giddens | |
| D532,794 | S | | 11/2006 | Glass | |
| D539,818 | S | * | 4/2007 | Giddens | D15/5 |
| D549,241 | S | * | 8/2007 | Giddens | D15/5 |
| D549,733 | S | * | 8/2007 | Strandell et al. | D15/5 |
| D619,620 | S | * | 7/2010 | Mayer et al. | D15/5 |
| D668,264 | S | * | 10/2012 | Tiefenthaler | D15/5 |
| RE43,920 | E | * | 1/2013 | Giddens | D15/5 |
| D673,980 | S | * | 1/2013 | Tiefenthaler | D15/5 |
| D687,070 | S | * | 7/2013 | Liao | D15/5 |
| 2001/0039845 | A1 | * | 11/2001 | Tachibana | 74/6 |
| 2003/0154934 | A1 | | 8/2003 | Nakamizo et al. | |
| 2003/0182823 | A1 | | 10/2003 | Sanders et al. | |
| 2004/0224806 | A1 | * | 11/2004 | Chonan | 474/93 |

OTHER PUBLICATIONS

U.S. Appl. No. 29/199,533 entitled *Portion of an Engine;* In re: Giddens; filed Feb. 16, 2004.

U.S. Appl. No. 29/211,389; entitled *Portion of an Internal Combustion Engine;* In re: Glass; filed Feb. 16, 2004.

* cited by examiner

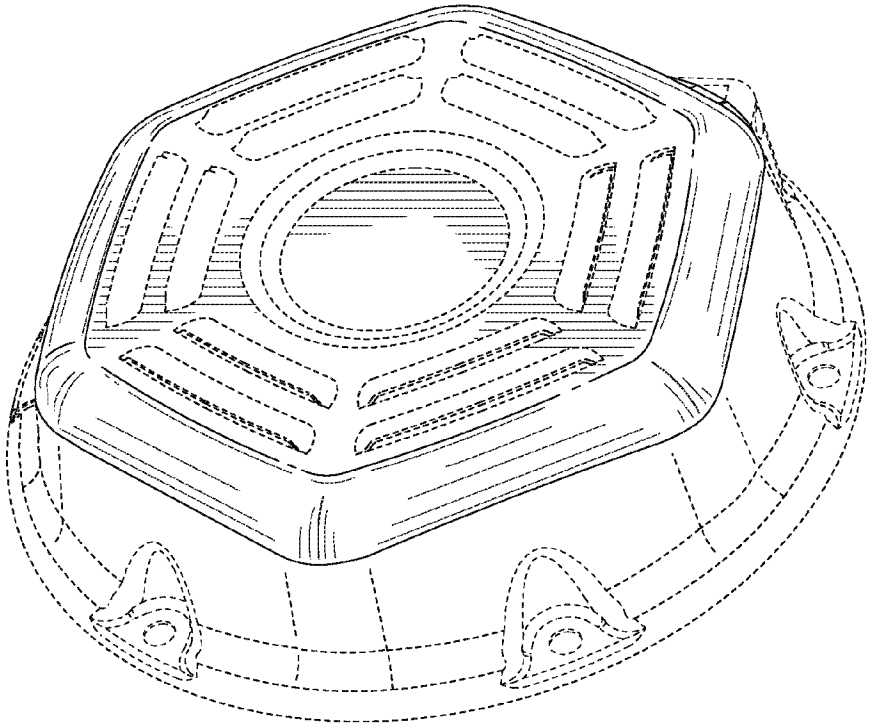
FIG. 1
NEW

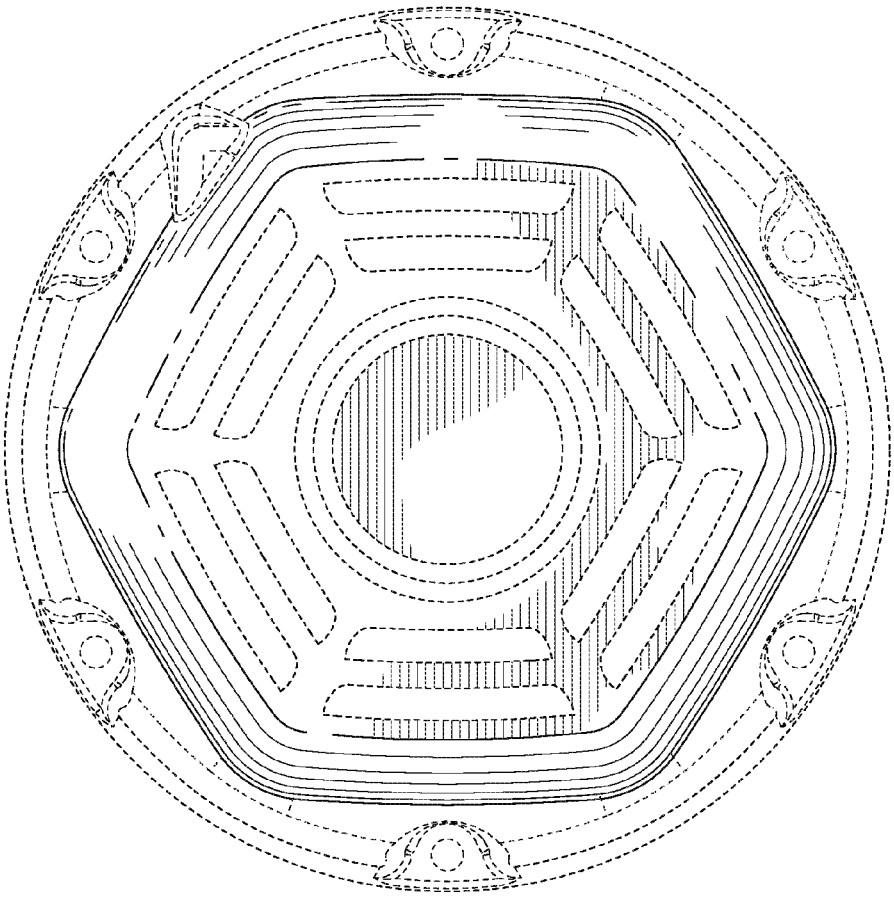
FIG. 2
NEW

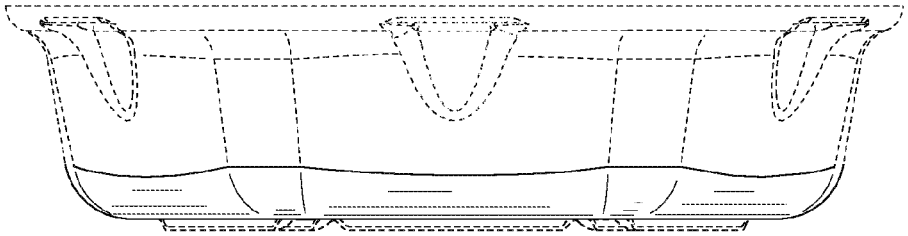
FIG. 3
NEW
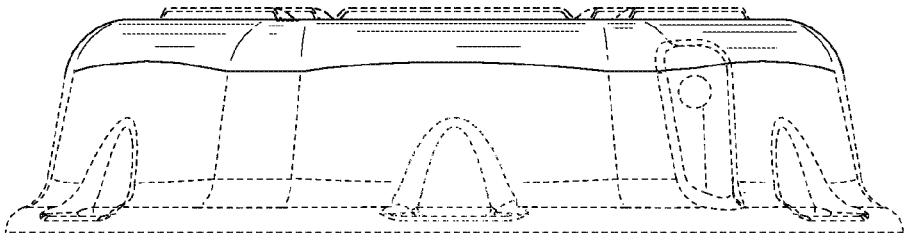
FIG. 4
NEW

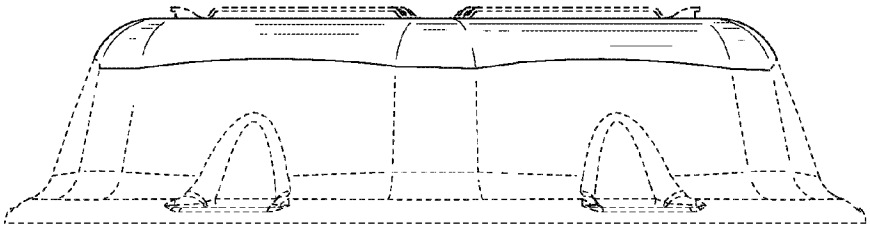
FIG. 5
NEW
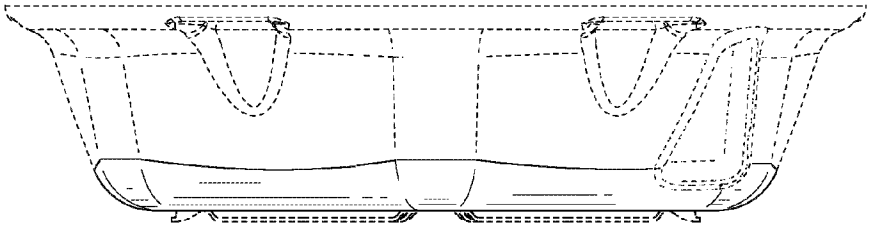
FIG. 6
NEW

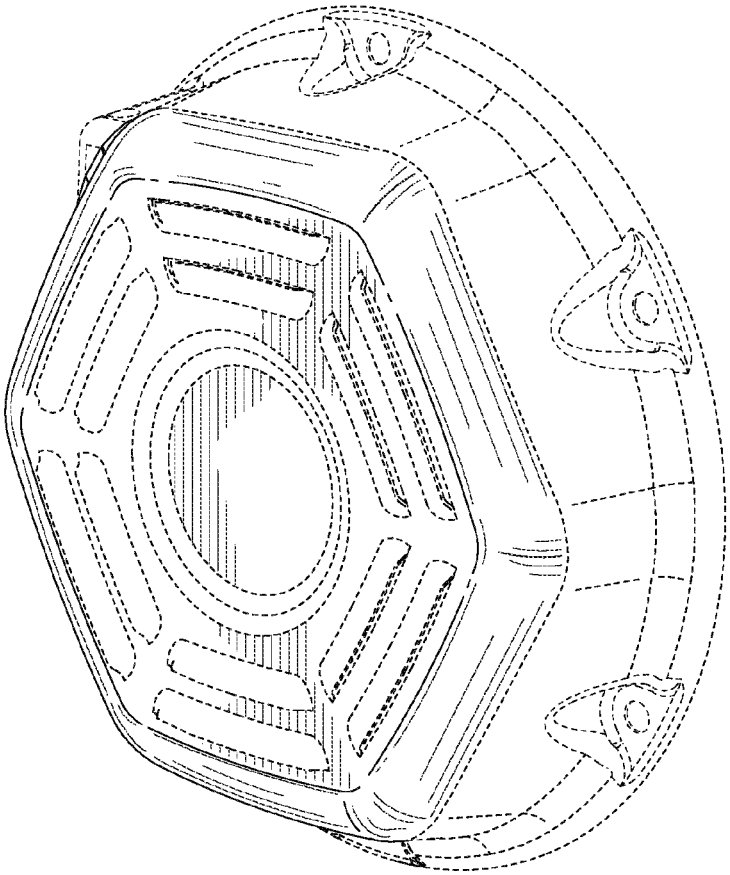
FIG. 7
NEW

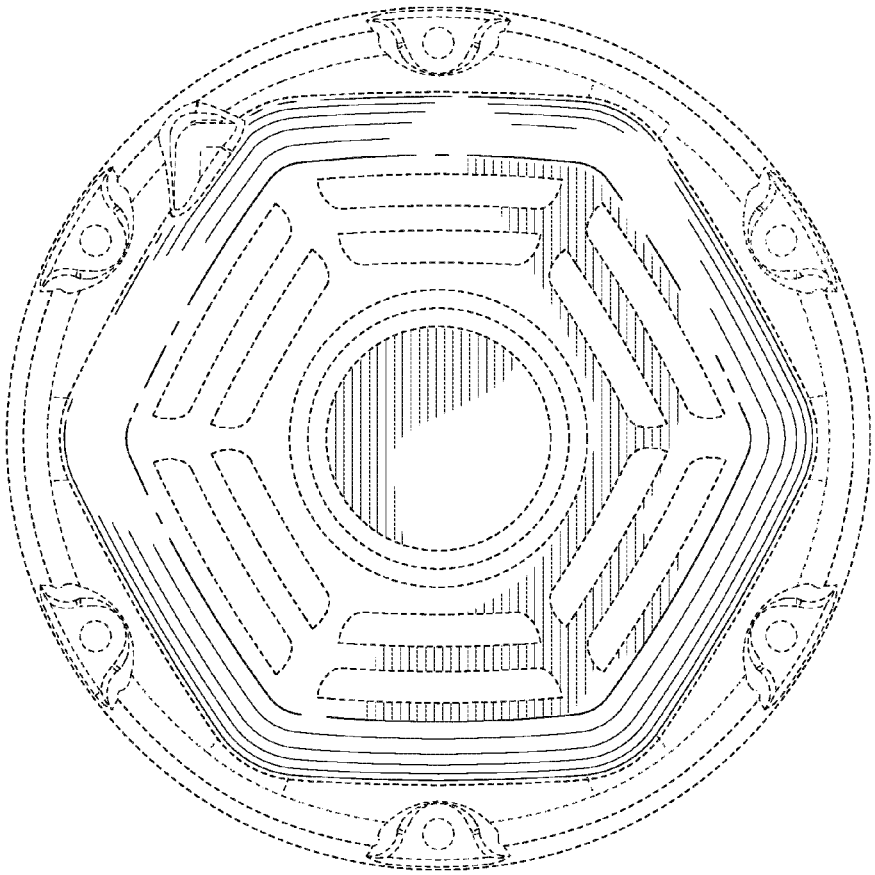
FIG. 8
NEW

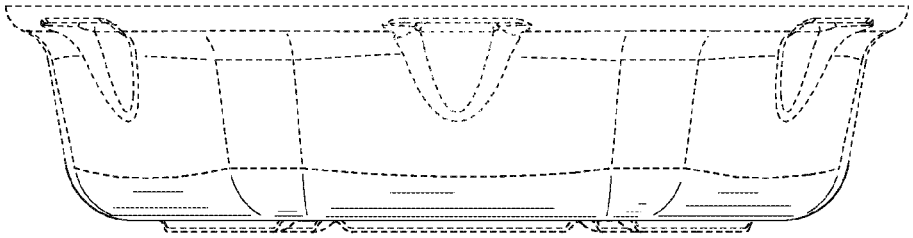
FIG. 9
NEW
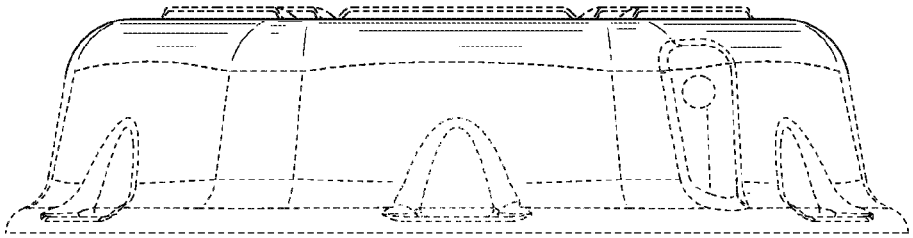
FIG. 10
NEW

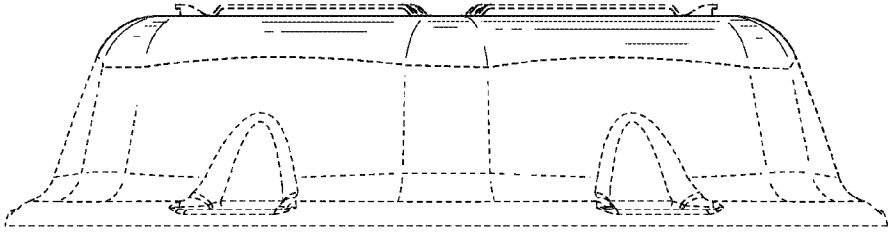
FIG. 11
NEW
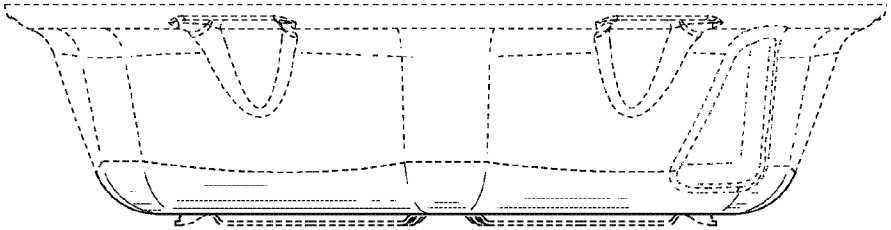
FIG. 12
NEW